US006371887B1

(12) United States Patent
Miller

(10) Patent No.: US 6,371,887 B1
(45) Date of Patent: Apr. 16, 2002

(54) ELECTRICAL POWER DRIVE DEVICE

(75) Inventor: Leo P. Miller, Roseville, MI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 17 days.

(21) Appl. No.: 09/613,055

(22) Filed: Jun. 30, 2000

(51) Int. Cl.[7] .............................................. B60K 41/04
(52) U.S. Cl. ..................................................... 477/115
(58) Field of Search ......................... 477/115; 290/1 D, 290/40 A, 40 B, 40 C, 40 D, 40 E, 40 F

(56) References Cited

U.S. PATENT DOCUMENTS 3,653,272 A * 4/1972 Scheiter ..................... 74/190.5
3,851,546 A * 12/1974 Kepple et al. ................ 74/785
4,631,469 A * 12/1986 Tsuboi et al. ............... 290/1 D
4,800,780 A * 1/1989 Sivalingam .................. 74/785
4,854,921 A * 8/1989 Kumm ........................ 474/70
5,122,099 A * 6/1992 Boedo et al. ............... 475/187
5,139,468 A * 8/1992 Churchill et al. ........... 475/324
5,328,419 A * 7/1994 Motl et al. .................. 475/324
5,557,977 A * 9/1996 Stockton .................... 74/15.84

* cited by examiner

*Primary Examiner*—Charles A. Marmor
*Assistant Examiner*—Roger Pang
(74) *Attorney, Agent, or Firm*—David L. Kuhn; Clifford C. Carter; Gail S. Soderling

(57) ABSTRACT

An improved accessory drive device is disclosed where the device will provide a substantial portion of the rated capacity at idle speed, essentially full capacity at a fast or tactical idle speed and will resume normal operating characteristics at highway speeds. The device will revert to the higher yield idle mode when the vehicle remains at idle for a predetermined time.

1 Claim, 1 Drawing Sheet

ELECTRICAL POWER DRIVE DEVICE

GOVERNMENT INTEREST

The invention described herein may be made, used and licensed by The Unites States for governmental purposes without paying me any royalty.

BACKGROUND OF THE INVENTION

1. Field of the Invention

In one aspect this invention relates to engine accessory drives useful with internal combustion prime movers. In a further aspect this invention relates to an engine accessory drive that is adapted to operate a driven accessory device at an efficient speed at low or tactical idle engine rpm but prevent over driving the device when the engine is operating normally.

2. Prior Art

In general, the internal combustion engine used in land vehicles drives one or more accessory devices through a combination of pulleys, belts, gears and drive shafts generally using power taken from a driving element i.e., the engine crankshaft, camshaft or flywheel gear. Examples of common accessories powered using the driving element in a military vehicle include: alternators, air conditioning, hydraulic pumps, cooling fans, power steering and water pumps. In a normal civilian vehicle, each accessory device will be equipped with a driven pulley which is sized so the accessory is driven at an acceptable output at low engine speed but which will not overdrive the accessory at normal engine operating rpm. By properly sizing the driven pulley on each accessory and some compromising of accessory design parameters, an acceptable level of accessory performance over the range of normal engine rpm conditions can be achieved. This requirement to compromise creates certain problems. For example, alternators are generally designed so they achieve their rated output when the engine rpm is at cruising speed or faster. Thus at normal idle, the alternator output will be well below its peak capacity. By way of illustration, an alternator having a rated capacity of 100 Amps will generally be designed and have a pulley so it is driven with a rotor speed of about twice the engine rpm. At an engine rpm of about 650 the rotor will be turning at about 1300 rpm and using the same 2:1 drive ratio the rotor speed would be about 2600 rpm at the military tactical idle. Referring to published power curves for 100 amp alternators, this will generate about 40 amps at an engine idle rpm of 650, 80 amps at tactical idle and 100 amps at normal engine cruising rpm of 2200. It is apparent that a 40-amp output leaves little current available at idle speed to operate systems or recharge batteries. Since starting an internal combustion engine is a considerable drain on the battery, the idle speed output does not generate sufficient current to recharge the battery in a reasonable length of time. For tactical military vehicles this problem is compounded by a duty cycle characterized by extensive periods of time with the engine idling while running accessories such as radar, radio and other electrical or accessories. Thus, it is desirable to have a mechanism where the alternator can power accessories at or near their maximum operating level even when the engine is idling for an extended period of time without the need to draw substantial power from the batteries.

One example of a commercially wide spread accessory drive used to match accessory power with system requirements is the viscous fan clutch used in automobiles. This device was developed to ensure sufficient cooling air was furnished to the radiator for proper engine cooling allowing higher fan speed when the coolant is hot or the airflow through the radiator is minimal. However, the clutch will reduce or eliminate the fan power requirements when enough cooling air was present without the fan's assist.

Another adjusting drive mechanism having more than one driving speed used with vehicle accessories is a variable speed pulley. This configuration where a v-belt drive rides in an adjustable pulley sheave, the sheave diameter and therefore the drive speed can be adjusted to cause a difference in accessory speed based on the required output and prime mover rpm. U.S. Pat. No. 4,969,857 represents one example of a variable drive pulley.

Military requirements are to a large extent unique, and the normal tradeoffs in drive speed and performance acceptable in civilian operation may not be acceptable in the military environment; particularly, since failure of military vehicles can result in death of service members. One of the critical operating requirements experienced by military vehicles and shared by civilian emergency vehicles is a need to stand with its engine idling for extended periods. Military vehicles generally are made with the ability to operate at what is referred to as tactical idle, which is an idle speed considerably above the normal commercial engine idle of 650 rpm at the crankshaft. Tactical idle may be in the range of 1000 to 1200 rpm at the crankshaft when the vehicle is stationary. While tactical idle is higher than the normal resting idle, it is not high enough for the alternator to reach the output level necessary to rapidly and fully recharge the batteries or provide sufficient power for other applications if driven at the normal 2:1 ratio discussed before. However, it does not solve the problem to merely change the drive ratios of the accessories, because if the alternator's rotor were driven at a higher rpm at idle, it would be seriously over driven and destroyed at highway cruising speeds.

What is needed, from a military perspective, is a simple reliable drive system for accessories that delivers the necessary accessory output i.e., current, hydraulic pressure, etc to perform mission functions over a range of engine speeds from standard to tactical idle rpm. But, the drive system should return the accessories to normal operating conditions when the vehicle is moving and operating in a normal mode. Since normal operations will include starting and stopping, it is desirable that the device which controls the speed of the accessory not reset every time the engine comes to idle rpm temporarily. However, an increased accessory speed is necessary when the vehicle is in an idle mode more than the time normally spent waiting to resume normal driving conditions and the device will operate accordingly. A further consideration is the drive must have a default provision that the drive goes to the low setting used for normal operation since the vehicle must have the capacity to move and "limp home" in the event of drive malfunction .

SUMMARY OF THE INVENTION

Briefly the present invention is designed to address the problems noted above. The device of this invention is generically a variable speed accessory driving combination with a relatively higher driving speed at lower engine rpm and a normal driving speed at normal engine cruising speed useful with a vehicle having a prime mover. The prime mover can be an internal combustion engine or similar source of power. The device has a power input driven by the engine crankshaft Thus input of this invention will have a speed proportional to the engine rpm.

A transmission is connected to and driven by the power input, the transmission having more than one drive ratio. The relatively high drive position will be engaged at idle speed to provide a correspondingly high accessory output relative to engine rpm. The relatively lower driving positions will function as a direct drive or in the case of a drive malfunction the default position and provide the normal auxiliary output common to land vehicle operation when the vehicle is not in an idle mode. The transmission's drive position is controlled by an activator, which will move the transmission to the desired drive position based upon certain preset operating parameters.

The device has an associated sensing means that measures one or more chosen engine functions, generally engine rpm, to determine in which drive position the transmission should operate. The sensing means will generate a signal in response to the monitored function, which in turn will cause the activator to move the transmission to the desired driving position. For example, drive position could depend on the idle speed of the engine combined with the time the engine has been operating at the idle speed.

DETAILED DESCRIPTION

Figure 1:
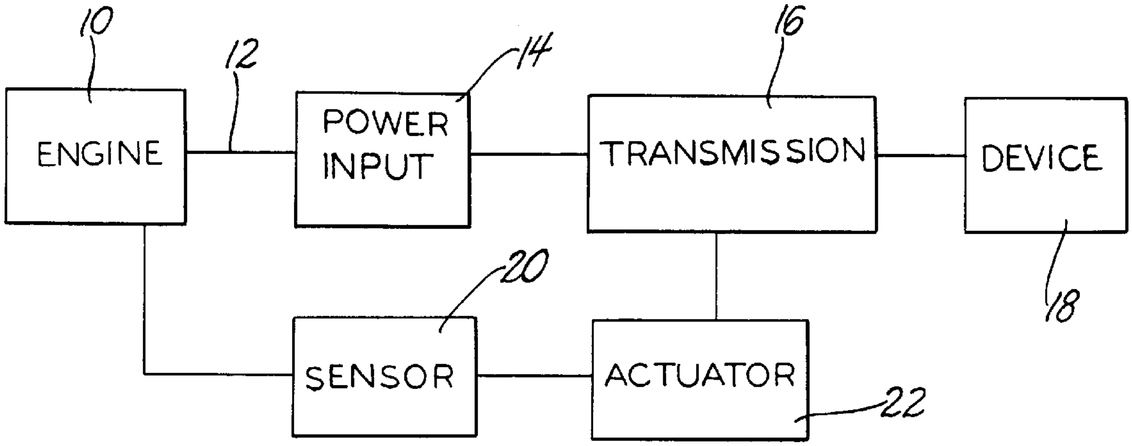
FIG. 1 is a block diagram of one system according to the invention.
Figure 2:
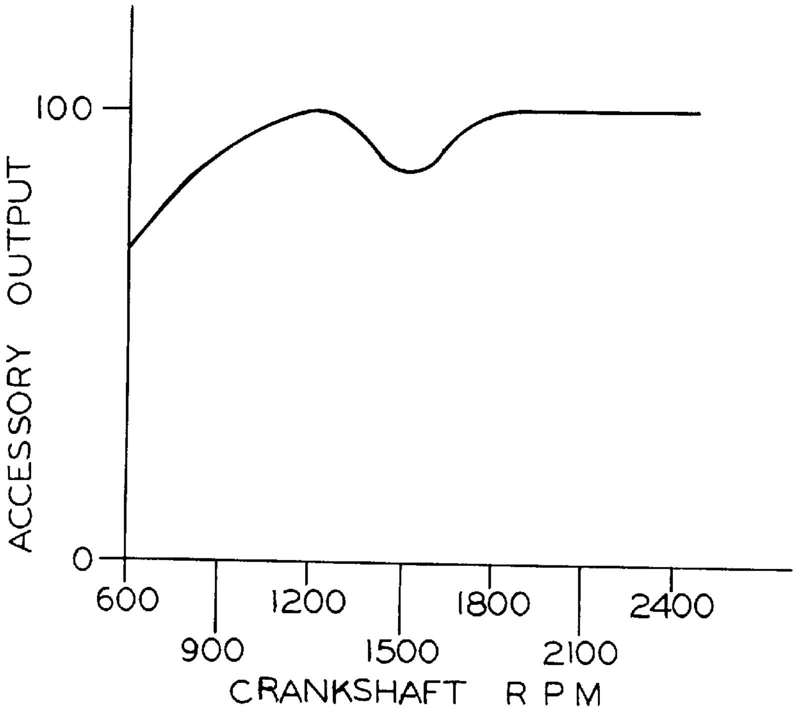
FIG. 2 is a graph of device output as a function of engine speed.

Referring to FIGS. 1 and 2, the basic concept and implementation of a device according to the invention are depicted. The invention is useful for and will be described in detail with respect to driving an alternator of a military tactical vehicle. Alternators are used to provide the electrical power for operating all vehicle electrical functions when the engine is operating and also are used to recharge the batteries that are the source of power when the engine is not operating. However, it is understood that a similar driving mechanism could be used for other systems such as hydraulic systems that can be used to power various vehicle devices.

In FIG. 1, an engine 10 is shown in block form, with a power connection 12 transferring power from the engine generally by way of the crankshaft, to power input 14. The most common structure to effect this transfer is the engine's crankshaft furnishes power to a driving pulley that has an associated v-belt engaging a driven pulley on the auxiliary device. This is a common structure and a detailed description is omitted in the interest of brevity.

In the present case the driven pulley is shown as the power input 14. The engine rpm and to pulley diameters will determine the rpm of the power input 14, which will be a linear function of the engine crankshaft rpm.

The power input 14 is mechanically connected to a transmission 16, which is designed to drive the associated accessory over a range of engine speeds at a level of at least 80% of the rated accessory output. The transmission is designed and controlled so it operates in a relatively high range when the engine first starts and is idling. With the transmission 16 in a relatively high driving speed on start up, any devices driven by the transmission will provide output near their design capability at initial engine idle speed. This level of output will help recharge the batteries and power the electrical systems even at initial idle speed. If the engine 10 continues to idle, the alternator 18 output will continue at the high level allowing the batteries to be recharged even at idle rpm and while operating the electrical functions. Since batteries can accept higher rates of power when they have been discharged, ensuring there is adequate power at low engine idle maximizes the recharging rate. This initial rapid recharge is particularly useful in diesel engine applications since diesel engines require large amounts of starting power, which must be furnished by the batteries. This results in a substantial depletion of the batteries potential power every time the engine is started. Under normal conditions, the alternator 18 output will not be sufficient at idle speed and fully recharging the batteries requires operating the vehicle over the road for a period of time. Repeated starting without the requisite intervening highway operation will deplete the batteries possibly to the point of failure.

Most alternators are designed to be driven at a rotor speed of about twice the engine crankshaft rpm. Such an alternator will approach its maximum power output rating when its rotor reaches about 4000 RPM, which would correspond to an engine crankshaft speed of 2000 rpm. If the high range is set at a 3:1 ratio as opposed to the normal 2:1, the alternator will generate a power curve as shown in FIG. 2 which will achieve 80% or more of the alternator design at normal engine idle 650 rpm and will provide essentially full output at a tactical idle as the crankshaft reaches about 1200 rpm.

Once the vehicle begins to move the engine rpm will begin to increase above 1350. If the transmission were to remain in the high position then the alternator rotor rpm would also increase and would rapidly exceed the design parameters. Overdriving the alternator rotor will cause premature failure. As the engine rpm passes through the tactical idle speed of about 1300 rpm, a sensor 20 will generate a signal that engine speed is increasing above the idle range and the transmission must be shifted to its lower range to prevent overdriving the alternator 18. The signal will activate the actuator 22, which in turn will shift the transmission to the lower range, generally a 2:1 drive ratio for alternators the drive ratio at which alternators are designed to operate effectively when the engine is at its normal operating rpm.

Military and some civilian emergency vehicles are frequently called upon to drive to a designated location and remain on watch for extended periods of time with the engines running at idle. While on station, such they need sufficient power to maintain good electronic operation including global positioning, radio contact weapons capability, sensing functions and the other electronic measures, which are becoming ubiquitous in modern warfare. When these watch periods extend up to several hours, operating the electrical devices may consume more power than the alternator provides and will not provide sufficient current to recharge the batteries. Since the transmission was shifted to the low range during travel, it is desirable that the transmission be shifted back to the high range when the vehicle has assumed its watch station and can be expected to remain on station for an extended period. Once the sensor 20 has determined the engine 10 has returned to an idle state for a predetermined time say 2 min, the sensor would send an activation signal to actuator 22 to place the transmission into high range. The predetermined delay function should be preset at a sufficiently long time that the transmission does not shift if the vehicle merely has to stop for a stop sign or other temporary rest in order to minimize any unnecessary shifts and power surges. Generally a time period of 2 to 5 minutes in the idle mode will signal that the vehicle has assumed a station and the increased power output should be resumed.

The transmission described above could be chosen from various types of variable power transmitting devices. Some examples are small inexpensive centrifugal clutches such as those used in go-karts. These devices are moderately priced and are adapted to be belt driven like normal accessories. Therefore, they do not require complex modifications to be integrated. They are also lightweight and have been used commercially for a long period, which gives increased confidence in their reliability.

FIG. 2 shows generically, the alternator current output as a function of engine crankshaft rpm of a typical 100 Amp alternator using a structure like that described above in FIG. 1. When starting the engine 10 will normally begin to idle at about 650 rpm. With the transmission 16 in the high range the alternator's rotor will be driven at about three times engine crankshaft rpm. At this speed the alternator will produce about 80 percent of its rated capacity or about 26 Volts and 80 Amps. This power level will start the recharging of the batteries even at idle speed. When a vehicle is at stationary watch and the engine idle is adjusted to the tactical mode, the power output increases to near the maximum output or about 100 Amps at 26 Volts. This provides sufficient power to ensure full electrical capability for all functions. When the engine rpm increases above tactical idle speed the actuator shifts the transmission to a lower direct drive position which will shift the alternator to the normal driving ratio of 2:1 and the power output will return to the normal curve shown as drop as shown and proceed as normal.

Although the present invention has been described with respect to electrical power generation, various alterations and modifications will become apparent to those skilled in the art without departing from the scope and spirit of this invention and it is understood this invention is limited only by the following claims.

What is claimed is:

1. An engine accessory driving combination useful with a vehicle having a prime mover as a power source including:

a power input driven by the prime mover;

a transmission connected to the power input, the transmission operating at relatively higher and lower positions, the higher drive position being chosen so that the transmission will operate at an elevated rpm at prime mover idle speeds and at a relatively lower drive speed when the vehicle is not in an idle mode;

an activator connected to the transmission the activator adapted to move the transmission between the higher and lower drive positions;

sensing means associated with and adapted to measure a monitored function of the prime mover and generate a signal in response to the monitored function to move the transmission to the desired driving position; and a timing means associated with the activator, the timing means tracking the time the prime mover has returned to an idle state after the engine has achieved normal operating speed, the timing means generating a signal when the engine has remained at idle for a predetermined time to cause the activator to shift the transmission to the higher drive position for increased accessory performance.

* * * * *